US012639857B2

(12) United States Patent
Tsuyama

(10) Patent No.: US 12,639,857 B2
(45) Date of Patent: May 26, 2026

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventor: Kazuya Tsuyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 18/494,942

(22) Filed: Oct. 26, 2023

(65) Prior Publication Data

US 2024/0144536 A1 May 2, 2024

(30) Foreign Application Priority Data

Oct. 27, 2022 (JP) ................................. 2022-171976

(51) Int. Cl.
*G06T 7/90* (2017.01)
*G06T 5/20* (2006.01)
*G06T 5/73* (2024.01)
*H04N 23/84* (2023.01)

(52) U.S. Cl.
CPC .................. *G06T 7/90* (2017.01); *G06T 5/20* (2013.01); *G06T 5/73* (2024.01); *G06T 2207/10024* (2013.01); *H04N 23/84* (2023.01)

(58) Field of Classification Search
CPC .................. G06T 5/00–94; G06T 7/90; G06T 2207/10024; H04N 25/60–6153; H04N 23/84
See application file for complete search history.

(56) References Cited

U.S. PATENT DOCUMENTS

| | | | |
|---|---|---|---|
| 5,879,284 A | 3/1999 | Tsujita | |
| 2008/0137947 A1* | 6/2008 | Sawada .................. | H04N 9/646 |
| | | | 348/E5.079 |
| 2009/0002574 A1* | 1/2009 | Sorek ..................... | H04N 25/61 |
| | | | 348/784 |
| 2010/0079615 A1* | 4/2010 | Hatakeyama ........ | H04N 25/611 |
| | | | 382/167 |
| 2011/0285879 A1* | 11/2011 | Hatakeyama ............. | G06T 5/73 |
| | | | 348/241 |

(Continued)

FOREIGN PATENT DOCUMENTS

JP          10-165365 A          6/1998

*Primary Examiner* — Sean T Motsinger
(74) *Attorney, Agent, or Firm* — Cowan, Liebowitz & Latman, P.C.

(57) ABSTRACT

An image processing device that performs recovery processing for recovering image deterioration in an image obtained by capturing an image formed by an imaging optical system, and includes a first color feature value acquisition unit configured to acquire a feature value related to a color of each pixel based on pixel information before the recovery processing is performed, an image recovery processing unit configured to perform the recovery processing on the image, a second color feature value acquisition unit configured to acquire a feature value related to a color of each pixel based on pixel information after the recovery processing is performed, and a pixel value correction unit configured to correct the image after the recovery processing based on the first color feature value and the second color feature value.

17 Claims, 14 Drawing Sheets

(56)          References Cited

U.S. PATENT DOCUMENTS

2012/0189226 A1*  7/2012  Okada ........................ G06T 5/20
                                                        382/254
2013/0050540 A1*  2/2013  Kano  ........................ G06T 5/80
                                                        348/241
2013/0050544 A1*  2/2013  Kano  ................... H04N 25/134
                                                        382/167
2013/0100310 A1*  4/2013  Ebihara ..................... G06T 5/70
                                                        348/222.1
2015/0055863 A1*  2/2015  Uchihara  ................ H04N 1/60
                                                        382/167
2016/0335749 A1*  11/2016  Kano  ........................ G06T 5/80
2018/0204528 A1*  7/2018  Miyazawa  .............. G09G 3/34
2020/0111198 A1*  4/2020  Hiasa ........................ G06T 5/60
2024/0144536 A1*  5/2024  Tsuyama ............. H04N 25/611

* cited by examiner

FIG. 1

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

|   | G |   | G |   | G |
|---|---|---|---|---|---|
| G |   | G |   | G |   |
|   | G |   | G |   | G |
| G |   | G |   | G |   |
|   | G |   | G |   | G |
| G |   | G |   | G |   |

| R |   | R |   | R |   |
|---|---|---|---|---|---|
|   |   |   |   |   |   |
| R |   | R |   | R |   |
|   |   |   |   |   |   |
| R |   | R |   | R |   |
|   |   |   |   |   |   |

|   |   |   |   |   |   |
|---|---|---|---|---|---|
|   | B |   | B |   | B |
|   |   |   |   |   |   |
|   | B |   | B |   | B |
|   |   |   |   |   |   |
|   | B |   | B |   | B |

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

FIG. 5A                        FIG. 5B
IMAGE RECOVERY FILTER
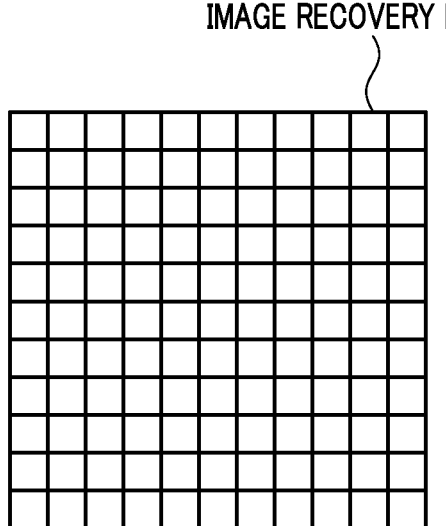
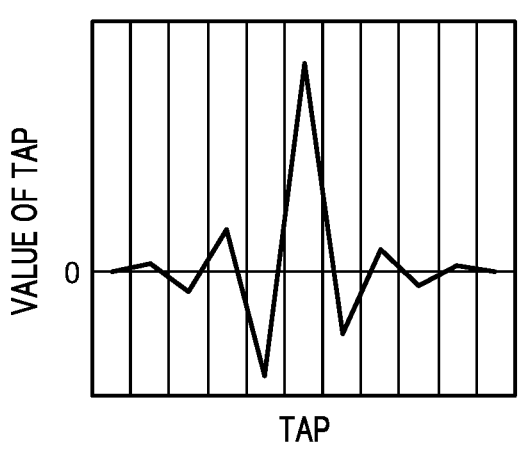
VALUE OF TAP
0
TAP

FIG. 8A
FIG. 8B
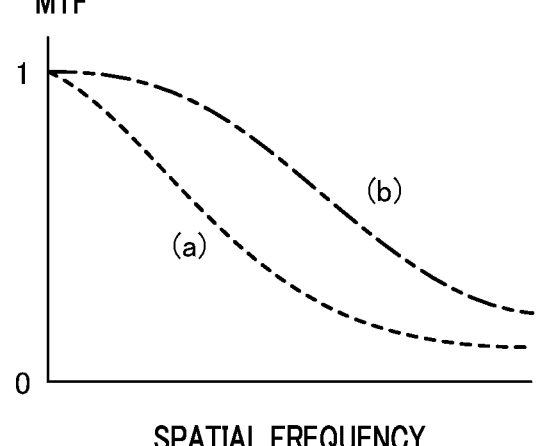
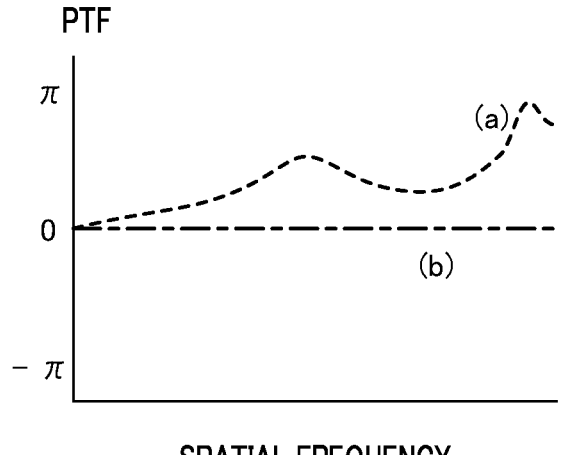

IMAGE PROCESSING DEVICE, IMAGE PROCESSING METHOD, AND STORAGE MEDIUM

BACKGROUND OF THE INVENTION

Field of the Invention

The present invention relates to an image processing device, an image processing method, a storage medium, and the like.

Description of the Related Art

For example, when a subject is imaged by a digital camera to form an image, the obtained image does not a little deteriorate considerably due in particular to an aberration of an imaging optical system. As a method of correcting the above-described deterioration, there is known a method of correcting an image by using optical transfer function (OTF) information of an imaging optical system. This method is referred to as image recovery or image restoration.

For example, Japanese Patent Application Laid-Open No. 10-165365 discloses a technique for eliminating blurring of an image by using a point spread function (PSF) corresponding to a fluorescence wavelength to be used for a range outside a focusing range of an imaging unit in an endoscope for observing the inside of a living body.

As described above, image quality can be improved by correcting various aberrations by performing image recovery processing on a captured input image. However, in actual imaging, an imaging state of an input image and a state of an image recovery filter for restoring the imaging state may not match optimally, and in principle, coloring may occur when recovery processing is performed.

Further, in the above-described Japanese Patent Application Laid-Open No. 10-165365, it is not possible to appropriately suppress coloring or the like that occurs in image recovery processing for a RAW image.

SUMMARY OF THE INVENTION

The present invention provides an image processing device that performs recovery processing for recovering image deterioration in an image obtained by capturing an image formed by an imaging optical system, the image processing device including at least one processor or circuit configured to function as a first color feature value acquisition unit configured to acquire a feature value related to a color of each pixel based on pixel information before the recovery processing is performed, an image recovery processing unit configured to perform the recovery processing on the image, a second color feature value acquisition unit configured to acquire a feature value related to a color of each pixel based on pixel information after the recovery processing is performed, and a pixel value correction unit configured to correct the image after the recovery processing based on the first color feature value and the second color feature value.

Further features of the present invention will become apparent from the following description of embodiments with reference to the attached drawings.

BRIEF DESCRIPTION OF THE DRAWINGS

FIG. 1 is a functional block diagram illustrating an example of a basic configuration of an imaging device according to a first embodiment of the present invention.

FIGS. 5A and 5B are diagrams illustrating an example of an image recovery filter according to the first embodiment.

FIG. 7A is a diagram illustrating a PSF before recovery processing, and FIG. 7B is a diagram illustrating a PSF after recovery processing.

FIGS. 8A and 8B are diagrams illustrating an MTF and a PTF in image recovery processing according to a second embodiment.

DESCRIPTION OF THE EMBODIMENTS

Figure 2:
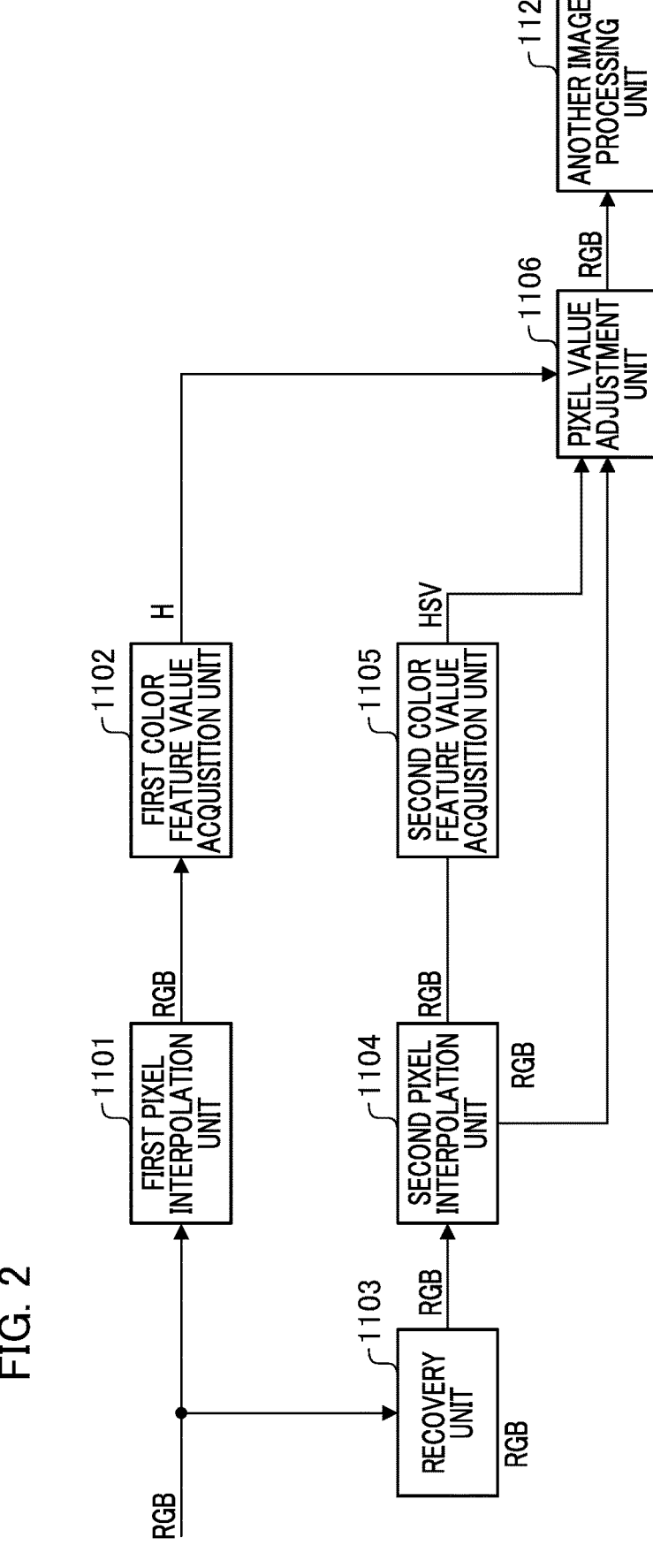
FIG. 2 is a functional block diagram illustrating a configuration example of an image recovery processing unit according to the first embodiment.

Hereinafter, with reference to the accompanying drawings, favorable modes of the present invention will be described using embodiments. In each diagram, the same reference signs are applied to the same members or elements, and duplicate description will be omitted or simplified.

First Embodiment

A captured image deteriorates considerably due in particular to an aberration of an imaging optical system, and examples of aberrations include a spherical aberration, a coma aberration, a field curvature aberration, and astigmatism of the optical system. When there is no aberration and no effect of diffraction, and a subject is in focus, a luminous flux emitted from one point of the subject is normally supposed to converge again on one point on an imaging plane, but these aberrations form an image with a spread, resulting in blurring of the image.

In the present embodiment, an optical point spread function (PSF) caused by an aberration is referred to as a blur component in an image. Color fringing in a color image, which is caused by an axial chromatic aberration, a chromatic spherical aberration, and a chromatic coma aberration of an optical system, can also be referred to as a difference in blurring for each wavelength of light. A color shift in a horizontal direction, which is caused by a chromatic aberration of magnification of the optical system, can also be referred to as a position shift or a phase shift due to a difference in imaging magnification for each wavelength of light.

An optical transfer function (OTF) obtained by performing a Fourier transform of a PSF is frequency component information of an aberration and is represented by a complex number. The absolute value of the OTF, that is, an amplitude component, is referred to as a modulation transfer function (MTF), and a phase component is referred to as a phase transfer function (PTF).

Thus, the MTF and the PTF are frequency characteristics of an amplitude component and a phase component, respectively, of image deterioration due to an aberration. Here, the phase component is represented by the following Equation 1 as a phase angle. Re(OTF) and Im(OTF) represent a real part and an imaginary part of OTF, respectively.

$$PTF=\tan-1(Im(OTF)/Re(OTF)) \qquad \text{(Equation 1)}$$

In this manner, the OTF of the imaging optical system deteriorates the amplitude component and the phase component of the image, and thus the deteriorated image is in a state where each point of a subject is asymmetrically blurred as in a coma aberration. The chromatic aberration of magnification occurs when an imaging position is shifted due to a difference in an imaging magnification for each wavelength of light, and this is acquired as, for example, RGB color components in accordance with spectral characteristics of an imaging device.

Thus, an image formation position is shifted between RGBs, and an image spread due to a shift in the image formation position for each wavelength, that is, a phase shift, is generated within each color component. Thus, to be precise, the chromatic aberration of magnification is not simply a color shift of a parallel shift, but unless otherwise specified, a color shift is described synonymously with a chromatic aberration of magnification.

As a method of correcting deterioration of an amplitude (MTF) and deterioration of a phase (PTF), there is known a correction method using OTF information of an imaging optical system. This method is referred to as image recovery or image restoration, and hereinafter, processing for correcting deterioration of an image using the OTF information of the imaging optical system will be referred to as image recovery processing or recovery processing.

An outline of image recovery processing is shown. When a deteriorated image is represented by g(x, y), the original image is represented by f(x, y), and the PSF that is the inverse Fourier transform of the optical transfer function is represented by h(x, y), the following Equation 2 is established. Here, * indicates a convolution, and (x, y) indicates coordinates on an image.

$$g(x,y)=h(x,y)*f(x,y) \qquad \text{(Equation 2)}$$

When this equation is Fourier-transformed and converted into a display format in a frequency plane, a product format for each frequency is obtained as shown in the following Equation 3. H is an OTF because it is the Fourier transform of the PSF. (u, v) represents coordinates on a two-dimensional frequency plane, that is, a frequency.

$$G(u,v)=H(u,v)*F(u,v) \qquad \text{(Equation 3)}$$

In order to obtain the original image from the captured deteriorated image, it is only necessary to divide both sides by H as shown in the following Equation 4.

$$G(u,v)/H(u,v)=F(u,v) \qquad \text{(Equation 4)}$$

The original image f(x, y) is obtained as a recovered image by performing an inverse Fourier transform of F(u, v) and returning it to the real plane. Here, when the inverse Fourier transform of 1/H in the above equation is assumed to be R, the original image can be similarly obtained by performing convolution processing on the image on the real plane as in the following equation.

$$g(x,y)*R(x,y)=f(x,y) \qquad \text{(Equation 5)}$$

R(x, y) is referred to as an image recovery filter. Since an actual image has a noise component, using an image recovery filter created by taking a complete reciprocal of an OTF as described above will amplify the noise component together with the deteriorated image, generally making it impossible to obtain a satisfactory image.

Consequently, for example, like a Wiener filter, it is only necessary to suppress a recovery rate on a high frequency side of an image in accordance with an intensity ratio between an image signal and a noise signal. As a method of correcting deterioration of a color fringing component of an image, for example, when the amount of blurring for each color component of an image becomes uniform through the above-described blurring component correction, correction is completed.

Here, since the OTF fluctuates depending on an imaging state such as the state of a zoom position and the state of an aperture diameter, it is desirable to change an image recovery filter used for image recovery processing accordingly. For example, Japanese Patent Application Laid-Open No. 10-165365 discloses a technique for eliminating blurring of an image by using a PSF corresponding to a fluorescence wavelength to be used for a range outside a focusing range of an imaging unit in an endoscope for observing the inside of a living body.

Since fluorescence is weak, an objective optical system with a small f-number is necessary, and the depth of focus becomes shallow. Thus, image recovery processing is performed for a non-focused range to obtain a focused image. That is, image quality can be improved by correcting various aberrations by performing image recovery processing on a captured input image.

However, in the actual imaging, an imaging state of an input image and the state of an image recovery filter for restoring the imaging state may not match optimally. An example thereof is imaging of a stereoscopic subject. An imaging device captures an image by focusing on one plane in a subject space using an autofocus function or a manual focus, but a subject distance varies depending on an angle of view when a subject is a three-dimensional object.

At this time, an in-focus object is imaged relatively sharply, but an out-of-focus object is imaged with a blur amount according to its distance. When information on a subject distance is only this focal point, it is only required that an optimum image recovery filter for each angle of view at the subject distance is selected or generated and used.

In the image after the image recovery processing, the in-focus object having a desired sharpness can be obtained because the recovery filter is optimal, but the out-of-focus object has some recovery effect but still remains blurred because the recovery filter is not optimal.

On the other hand, it has been hitherto known, as a three-dimensional expression of a subject and an extraction expression of an object of interest, that a blurring degree corresponding to a subject distance produces an effective effect as a photograph. One example thereof is a photographic expression in which a main object is focused using a telephoto lens with a shallow depth of field and the background is intentionally blurred. In the image after the image recovery processing, it is desirable that the in-focus object is further sharpened, and the out-of-focus object remains blurred, and this can be achieved by the image recovery method described above.

However, in principle, coloring may occur when recovery processing is performed on the out-of-focus object using an image recovery filter that is originally created for an in-focus distance and is not optimal for an out-of-focus object distance. Here, the coloring means that, for example, in an edge portion of an out-of-focus object, a color that is not present in a subject appear in an image after image recovery processing due to a difference in a relationship between blurring of respective color components of the image before and after the image recovery processing.

Furthermore, such coloring may occur without being limited to the imaging of the three-dimensional subject described above. Regardless of whether it is in focus or not, coloring occurs when the state of an aberration in the actual imaging state is different from the state of aberration targeted by an image recovery filter for performing recovery processing on the input image due to, for example, variations in the manufacturing of the imaging optical system, fluctuations in the light source spectrum at the time of imaging, or the like.

As a method of suppressing such coloring, a method of correcting the color of an image after image recovery processing based on color information of the image before the image recovery processing is conceivable. That is, it is a method of determining a change in color due to the image recovery processing in each pixel of the image and suppressing coloring due to the image recovery processing.

Incidentally, when a color filter array of an imaging element is a general Bayer array, a RAW image having a color component of one color in each pixel can be obtained from the imaging element. For example, the following two methods are conceivable for image recovery processing in an imaging device having an imaging element of a Bayer array.

The first method is a method of applying image recovery processing to each color plane in which each pixel has collection of RGB color components by pixel interpolation of color components in a RAW image. The second method is a method of applying image recovery processing to a RAW image as it is in which each pixel has a color component of one color without performing pixel interpolation.

Compared to the latter method of applying image recovery processing to a RAW image, the former method of applying image recovery processing to each color plane increases the number of pixels to which the image recovery processing is applied and the number of taps of a recovery filter, resulting in a significant increase in a processing load of the image recovery processing.

For this reason, in systems that require a low processing load, it is considered that the latter method of applying image recovery processing to a RAW image is effective. Also when image recovery processing is applied to a RAW image, coloring may occur in an output image obtained by developing the RAW image when the state of an aberration in the actual imaging state is different from the state of aberration targeted by an image recovery filter.

However, since a RAW image has only a color component of one color in each pixel, there is no color information represented by three RGB color components in each pixel. Thus, it is not possible to use the above-described method of correcting the color of an image after the image recovery processing as it is based on the color information of the image before the image recovery processing in order to suppress coloring occurring in the image recovery processing.

In image recovery processing for a RAW image for improving the image quality of an output image, the inability to appropriately suppress such coloring is a new problem as an adverse effect of significantly deteriorating image quality.

However, in the related art disclosed in Japanese Patent Application Laid-Open No. 10-165365, it is not possible to appropriately suppress coloring that occurs in image recovery processing in a RAW image. Consequently, the first embodiment provides an image recovery processing method and an imaging device using the same which are capable of suppressing coloring that occurs in image recovery processing in a RAW image.

Figure 1:
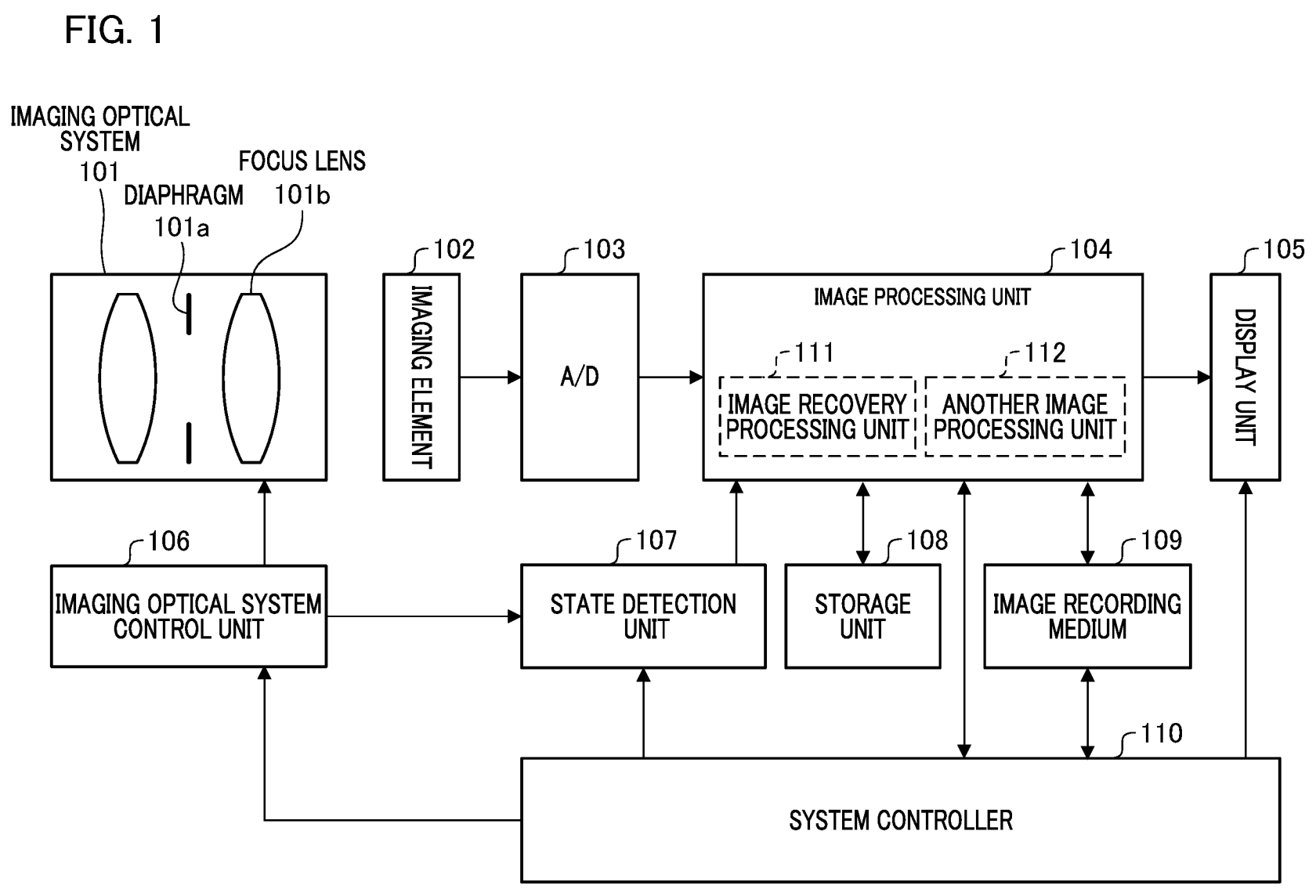

FIG. 1 is a functional block diagram illustrating an example of a basic configuration of the imaging device according to the first embodiment of the present invention. Some of the functional blocks illustrated in FIG. 1 are realized by causing a computer, which is not illustrated in the drawing, included in the imaging device to execute a computer program stored in a memory as a storage medium which is not illustrated in the drawing.

However, some or all of them may be realized by hardware. As hardware, a dedicated circuit (ASIC), a processor (reconfigurable processor, DSP), or the like can be used. The functional blocks illustrated in FIG. 1 may not be built in the same housing, and may be configured by separate devices connected to each other via signal paths. The above description related to FIG. 1 applies to FIG. 2 as well.

An imaging optical system 101 forms an image of a subject on a light receiving surface of an imaging element 102. Imaging light is converted into an electric signal by the imaging element 102, converted into a digital signal by an A/D converter 103, and input to an image processing unit 104. The image processing unit 104 includes an image recovery processing unit 111 and another image processing unit 112. Here, the image processing unit 104 functions as an image processing device that performs recovery processing to recover image deterioration in an image obtained by capturing an image formed by the imaging optical system.

The image processing unit 104 obtains information on an imaging state of the imaging device from a state detection unit 107. The state detection unit 107 may obtain state information directly from a system controller 110, or can also obtain, for example, imaging state information on the imaging optical system 101 from an imaging optical system control unit 106. Next, an image recovery filter corresponding to the imaging state is selected from a storage unit 108, and the image recovery processing unit 111 performs image recovery filter application processing on an image input to the image processing unit 104.

Details of the image recovery processing unit 111 will be described later. Data stored in the storage unit 108 may not be an image recovery filter, but may be information on an OTF required to generate the image recovery filter.

In this case, the image recovery processing unit 111 selects information on an OTF according to the imaging state from the storage unit 108, generates an image recovery filter according to the imaging state, and then performs image recovery processing on the image input to the image processing unit 104. Further, another image processing unit 112 performs predetermined image processing other than image recovery processing, such as gamma correction and color balance adjustment, to generate an image file such as JPEG.

An image recording medium 109 stores an output image processed by the image processing unit 104 in a predetermined format. Further, a display unit 105 may display an image that has been subjected to predetermined display processing on an image after image recovery processing, or may display an image that has not been subjected to image recovery processing or has been subjected to simple recovery processing.

The system controller 110, which has a built-in CPU as a computer, performs the above-described series of controls by executing a computer program stored in a memory and performs mechanical driving of the imaging optical system 101 through the imaging optical system control unit 106.

The imaging optical system control unit 106 controls an aperture diameter of a diaphragm 101a based on imaging state settings (F number setting) from the system controller 110. The position of a focus lens 101b is controlled via the imaging optical system control unit 106 by an autofocus (AF) mechanism or a manual focus mechanism, which is not illustrated in the drawing, in order to adjust a focus in accordance with a subject distance.

The imaging optical system 101 may include an optical element such as a low-pass filter or an infrared cut filter. However, when an optical element that affects the characteristics of the OTF, such as a low-pass filter, is used, it is desirable to consider the influence of the OTF on the optical element at a point in time when an image recovery filter is created.

Also in the infrared cut filter, it affects each PSF of RGB channels, which is an integral value of a PSF of a spectral wavelength, especially the PSF of the R channel, and thus it may be necessary to consider it at a point in time when an image recovery filter is created.

The imaging optical system 101 in FIG. 1 may be fixed as a portion of the imaging device, or may be replaceable.

FIG. 2 is a functional block diagram illustrating a configuration example of the image recovery processing unit according to the first embodiment. As illustrated in FIG. 2, point-sequential R, G, and B signals (RAW signals) from each pixel are input to a first pixel interpolation unit 1101 and a recovery unit 1103 as an image recovery processing unit for performing recovery processing.

The point-sequential R, G, and B signals from each pixel are synchronized by the first pixel interpolation unit 1101, interpolated to include the R, G, and B signals for each pixel, and supplied to a first color feature value acquisition unit 1102. The first color feature value acquisition unit 1102 acquires a feature value related to the color of each pixel before recovery processing based on pixel information before the recovery processing is performed by the recovery unit 1103.

On the other hand, the recovery unit 1103 performs predetermined image recovery processing on the input image, and the R, G, and B signals subjected to the image recovery processing are synchronized by a second pixel interpolation unit 1104 and are interpolated to include R, G, B signals for each pixel. Furthermore, the output of the second pixel interpolation unit 1104 is supplied to a second color feature value acquisition unit 1105 and also supplied to a pixel value adjustment unit 1106 as a pixel value correction unit.

The second color feature value acquisition unit 1105 acquires a feature value related to the color of each pixel after recovery processing based on pixel information after the recovery processing has been performed by the recovery unit 1103. Further, the output of the first color feature value acquisition unit 1102 and the output of the second color feature value acquisition unit 1105 are supplied to the pixel value adjustment unit 1106, and the image having been subjected to the recovery processing by the recovery unit 1103 is corrected based on a first color feature value and a second color feature value. The output of the pixel value adjustment unit 1106 is further supplied to another image processing unit 112 to perform another image processing.

Figure 3:
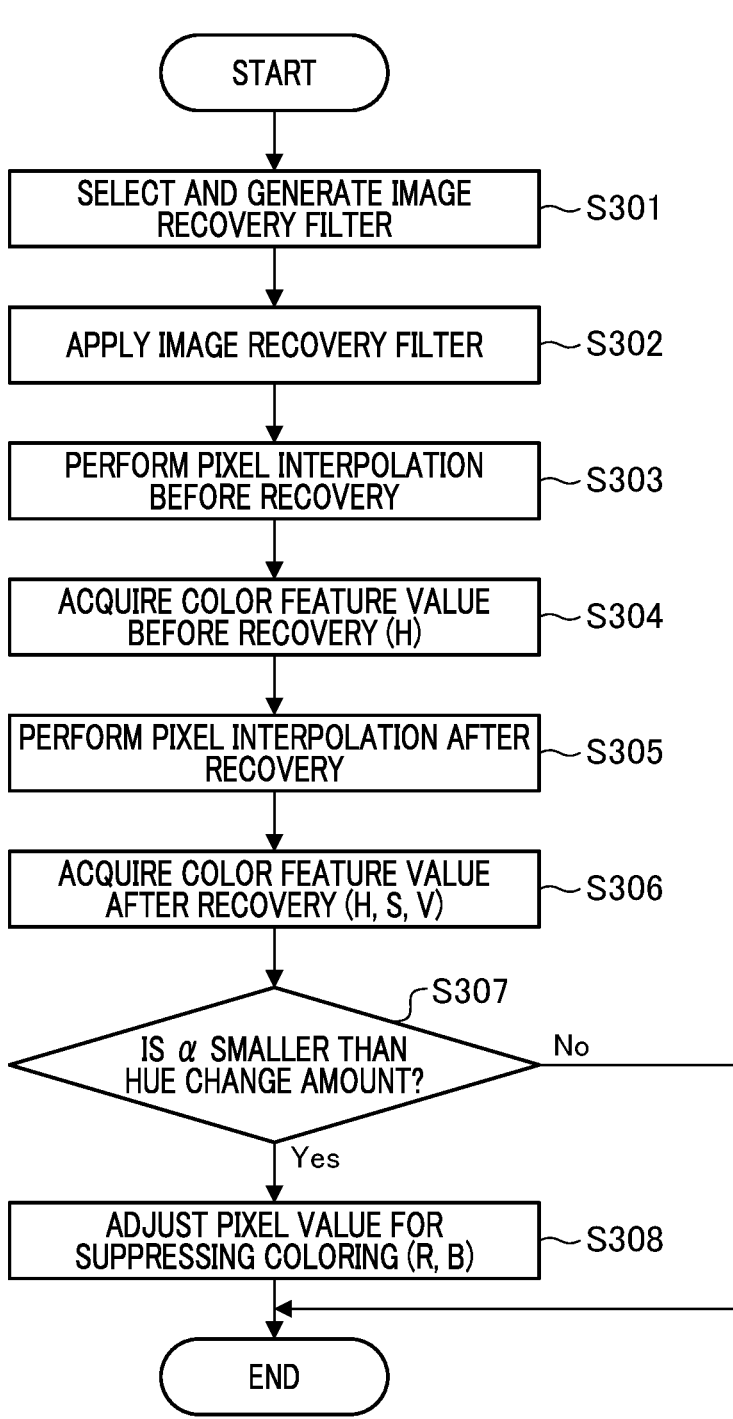
FIG. 3 is a flowchart illustrating an example of a processing flow in an image recovery processing unit 111 according to the first embodiment.

FIG. 3 is a flowchart illustrating an example of a processing flow in the image recovery processing unit 111 according to the first embodiment. An image processing method of performing recovery processing for recovering image deterioration for an image obtained by capturing an image formed by the imaging optical system in the first embodiment will be described using FIG. 3. The computer in the image processing unit 104 or the system controller 110 executes the computer program stored in the memory to perform operations of steps in the flowchart of FIG. 3.

Figures 4A, 4B, 4C, 4D, 4E, 4F, 4G:
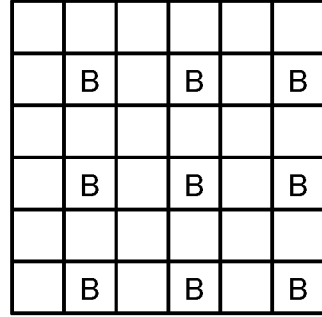
FIGS. 4A to 4G are diagrams illustrating color filters and color components in a Bayer array according to the first embodiment.

FIGS. 4A to 4G are diagrams illustrating color filters and color components in a Bayer array according to the first embodiment. As illustrated in FIG. 4A, color filters of a Bayer array are disposed on the light receiving surface of the imaging element, and each pixel receives light through one color filter. Thus, RGB color components having a color component of one color for each pixel are input to the image recovery processing unit 111 as a RAW image.

In the Bayer array, the color filters of RGB colors are disposed every other pixel as illustrated in FIGS. 4B to 4D. FIG. 4B illustrates the arrangement of the G color filters, FIG. 4C illustrates the arrangement of the R color filters, and FIG. 4D illustrates the arrangement of the B color filters.

In the processing flow of FIG. 3, in step S301, an image recovery filter suitable for imaging conditions is selected. At this time, the selected image recovery filter may be corrected as necessary. That is, in order to reduce the number of pieces of data of an image recovery filter that has been prepared in the storage unit 108 in advance, data in a discrete imaging state is prepared in the storage unit 108. Then, when processing is actually performed in an image recovery process, an image recovery filter corresponding to an imaging state may be generated from information on an OTF, for example, by interpolation.

Next, in step S302, the recovery unit 1103 in FIG. 2 performs convolution processing on each pixel of each color component of a captured input image using the image recovery filter selected in step S301. Thereby, it is possible to correct the asymmetry of an aberration generated in the imaging optical system and remove or reduce a blurring component of the image. Here, step S302 functions as an image recovery processing step for performing recovery processing on a RAW image having a color component of one color for each pixel.

Next, the above-described image recovery filter will be described with reference to FIG. 5. FIGS. 5A and 5B are diagrams illustrating an example of the image recovery filter according to the first embodiment. The image recovery filter illustrated in FIG. 5 is an example of an image recovery filter applied to each color plane of an image in which each pixel has collection of RGB color components. FIG. 5A is a diagram illustrating an example of the number of taps of a two-dimensional filter, and FIG. 5B is a diagram illustrating a cross-section of the two-dimensional filter.

The number of taps of the image recovery filter can be determined in accordance with the amount of aberration of the imaging optical system, and in this example, as illustrated in FIG. 5A, the image recovery filter is a two-dimensional filter with 11×11 taps. Each of the tap of the filter corresponds to one pixel of the image and is subjected to convolution processing in an image recovery process.

By using a two-dimensional filter that divides the image recovery filter into more than 100 parts as illustrated in FIG. 5A, it is also possible to recover aberrations that widely spread from an imaging position by the imaging optical system, such as a spherical aberration, a coma aberration, an axial chromatic aberration, and off-axis chromatic flare.

Although values in the taps are not illustrated in FIG. 5A, one cross-section of this filter is illustrated in FIG. 5B. This image recovery filter can be created by calculating or measuring an OTF of the imaging optical system as described above and performing an inverse Fourier transform on the reciprocal thereof.

In general, it is necessary to consider the influence of noise, and thus a method of creating a Wiener filter or a method of creating a related recovery filter is appropriately selected and used. Furthermore, an OTF can include factors that deteriorate the OTF not only for the imaging optical system but also for an image input to the image processing unit 104.

For example, a low-pass filter suppresses high-frequency components with respect to frequency characteristics of an OTF. The shape and aperture ratio of a pixel aperture of an imaging element also affect the frequency characteristics. Other examples include spectral characteristics of a light source and spectral characteristics of various wavelength filters. It is desirable to create an image recovery filter based on the OTF in a broad sense including these.

When an image is a color image in an RGB format, it is only required that three image recovery filters corresponding to color components of R, G, and B are created. Since the imaging optical system has a chromatic aberration, and the degree of blur differs for each color component, characteristics of the image recovery filter for each color component are slightly different based on a chromatic aberration.

That is, the shape of the filter as illustrated in the cross-sectional view of FIG. 5A is different for each color component. The number of vertical and horizontal taps of the image recovery filter does not have to be a square array, and can be arbitrarily changed as long as it is taken into consideration at the time of convolution processing.

Figure 6A:
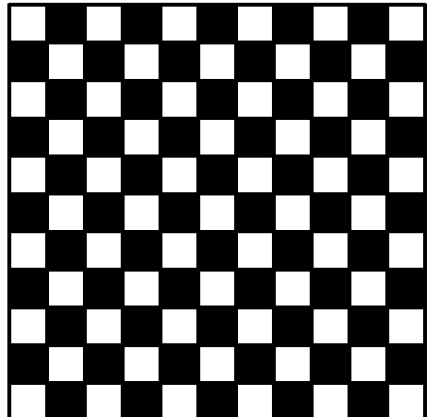
FIGS. 6A and 6B are diagrams illustrating an example of an image recovery filter to be applied to a RAW image according to the first embodiment.
Figure 6B:
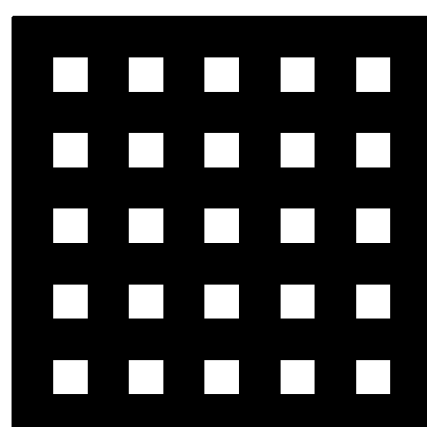

FIGS. 6A and 6B are diagrams illustrating an example of an image recovery filter to be applied to a RAW image according to the first embodiment. As described above, with respect to an image recovery filter applied to each color plane of an image in which each pixel has collection of RGB color components, FIG. 6 illustrates an example of an image recovery filter to be applied to a RAW image in which each pixel has a color component of one color. The example is an example of an image recovery filter that holds coefficients for periodic pixels in which target color components exist, and areas holding coefficients are shown in white and other areas holding 0 are shown in black.

When image recovery is performed for three color components of R, G, and B, the image recovery filter applied to the G component is illustrated in FIG. 6A, and the image recovery filter applied to the R and B components is illustrated in, for example, FIG. 6B. That is, the recovery unit 1103 performs convolution processing of the G component illustrated in FIG. 4B and the image recovery filter illustrated in FIG. 6A, and convolution processing of the R component and B component illustrated in FIGS. 4C and 4D, respectively, and the image recovery filter illustrated in FIG. 6B.

Next, in step S303, the first pixel interpolation unit 1101 performs pixel interpolation on an input image. As a result of this processing, as illustrated in FIGS. 4B to 4D, a G plane image in which all pixels have a G component, an R plane image in which all pixels have an R component, and a B-plane image all pixels have a B component are obtained from a state where respective colors are disposed every other color as illustrated in FIGS. 4E to 4G.

Next, in step S304, the first color feature value acquisition unit 1102 acquires hue information H of an input image from the images of the G, R, and B components created by the first pixel interpolation unit 1101. At this time, the hue information H can be calculated using a general method of converting RGB to HSV. Here, step S304 functions as a first color feature value acquisition step for acquiring a feature value (at least hue information) related to the color of each pixel before recovery processing based on pixel information before the recovery processing.

Next, in step S305, the second pixel interpolation unit 1104 performs pixel interpolation on the image after the image recovery processing which is created by the recovery unit 1103. As a result of this processing, the G, R, and B signals disposed every other pixel illustrated in FIGS. 4B, 4C, and 4D are in a state where each pixel has three color components of G, R, and B components as illustrated in FIGS. 4E, 4F, and 4G.

Next, in step S306, the second color feature value acquisition unit 1105 acquires hue information H, saturation information S, and brightness information V of the image after the image recovery processing from the G, R, and B components created by the second pixel interpolation unit 1104. At this time, the hue H can be calculated using a general method of converting RGB into HSV.

Here, step S306 functions as a second color feature value acquisition step for acquiring a feature value (at least hue information) related to the color of each pixel after recovery processing based on pixel information after the recovery processing has been performed.

Next, in steps S307 and S308, the pixel value adjustment unit 1106 adjusts a pixel value after image recovery processing. That is, the pixel value adjustment unit 1106 input the hue information H of the input image which is acquired by the first color feature value acquisition unit 1102, the hue information H of the image after image recovery processing, the saturation information S, and the brightness information V which are acquired by the second color feature value acquisition unit 1105. Further, the pixel value adjustment unit 1106 inputs the G, R, and B components after the image recovery processing which are created by the recovery unit 1103 and adjusts the pixel values after the image recovery processing based on these.

The pixel value adjustment at this time suppresses coloring after the image recovery processing. Here, when coloring occurs after the image recovery processing, hue change amounts before and after the recovery processing in a pixel in which coloring has occurred tend to be larger than a hue change amount of a pixel in which coloring has not occurred.

For this reason, in step S307, for pixels of which hue change amounts before and after the recovery processing are larger than a predetermined allowable hue change amount α, R and B components after the image recovery processing are adjusted to a hue change amount (H±α) within an allowable range from the hue before the recovery processing in step S308. Thereby, it is possible to suppress coloring that occurs after the image recovery processing.

In step S307, the flow of FIG. 3 is terminated without performing pixel value adjustment for pixels of which hue change amounts before and after the recovery processing are equal to or less than the predetermined allowable hue change amount α. Here, step S308 functions as a pixel value correction step for correcting an image after recovery processing based on a first color feature value and a second color feature value.

From here on, a method of adjusting a hue to a target hue Ht by adjusting R and B out of R, G, and B will be described in detail. Description is given on the assumption that the RGB components before the image recovery processing are R, G, and B, a hue is H, the RGB components after the image recovery processing are R', G', and B', and an allowable hue change amount is α.

First, R" and B" in which the hue after the image recovery processing is H in a state where the value of G' is fixed are obtained. Regarding a method of obtaining R" and B", it is only required that R and B are obtained such that a color ratio after the image recovery processing has the same value as a color ratio before the image recovery processing, as in the following Equations 6 and 7.

$$R''=G'\times R/G \tag{Equation 6}$$

$$B''=G'\times B/G \tag{Equation 7}$$

Next, Rt and Bt when the hue after the image recovery processing is set to the target hue H±α are obtained using the following Equations 8 and 9.

$$Rt=R'+(R''-R')\times\beta \tag{Equation 8}$$

$$Bt=B'+(B''-B')\times\beta \tag{Equation 9}$$

Here, when MAX is the maximum values of G', Rt and Bt, and MIN is the minimum values of G', Rt and Bt, β is a value obtained by substituting Equations 8, 9, and 10 into any one of Equations 11, 12, and 13 in accordance with the value of the minimum value MIN. When the minimum value MIN=Bt, Equations 8, 9, and 10 are substituted into Equation 11. When the minimum value MIN=Rt, Equations 8, 9, and 10 are substituted into Equation 12. When the minimum value MIN=G', Equations 8, 9, and 10 are substituted into Equation 13.

The target hue Ht is as shown in Equation (10). However, it is not possible to obtain a magnitude relationship between G', Rt, and Bt before β is obtained, and thus six types of magnitude relationships that three values can be taken are assumed to obtain six types of β. Finally, β that makes a magnitude relationship between G', Rt, and Bt when substituting the obtained β into Equations 8 and 9 match the assumed magnitude is adopted. At this time, β to be adopted is uniquely determined.

$$Ht=H\pm\alpha \tag{Equation 10}$$

$$Ht=60\times(G'-Rt)/(MAX-MIN)+60 \tag{Equation 11}$$

$$Ht=60\times(Bt-G')/(MAX-MIN)+180 \tag{Equation 12}$$

$$Ht=60\times(Rt-Bt)/(MAX-MIN)+300 \tag{Equation 13}$$

In step S308, the pixel values R and B after the image recovery processing are adjusted by the above-described method to limit the hue change amounts before and after the recovery processing to fall within a predetermined range. Thereby, it is possible to suppress the occurrence of coloring after the image recovery processing.

As described above, the image recovery processing in the image processing unit 104 is terminated by performing the processing in accordance with the processing flow of FIG. 3. Since the OTF changes depending on an angle of view (image height) of the imaging optical system even in one imaging state, it is desirable to change the image recovery processing in the first embodiment for each divided region of an image according to the image height.

At this time, it is only required that the image recovery filter is horizontally scanned while performing convolution processing on the image, and the filter is sequentially changed for each region. That is, step S302 is executed for each target pixel of each image recovery component.

In the first embodiment, the application of the image recovery filter is treated as image recovery processing, but for example, different processing such as distortion correction processing, peripheral light amount correction processing, and noise reduction processing can be combined before, after, or during the flow of the first embodiment and can be treated as image recovery processing.

In the first embodiment, image recovery processing is not limited to convolution processing of image recovery filters, and for example, image recovery processing may be performed using a machine learning model. In that case, it is only required that the weight of the machine learning model is learned in advance, and the recovery unit 1103 performs image recovery processing by the machine learning model using the learned weight.

An example of an imaging device using the image processing method according to the first embodiment has been described above. However, the image processing method in the first embodiment can be variously modified and changed within the scope of the gist, is not limited to use by the device, and can be used as an algorithm for image processing software that operates on, for example, a PC.

Second Embodiment

Next, image recovery processing according to a second embodiment of the present invention will be described. First, an image recovery filter that does not include a magnification chromatic aberration correction component and is used in the second embodiment, and correction of a chromatic aberration of magnification will be described. Characteristics of a spatial region and a frequency region of the image recovery filter that does not include the magnification chromatic aberration correction component according to the second embodiment will be described using FIGS. 7A and 7B and FIGS. 8A and 8B.

Figures 7A, 7B:
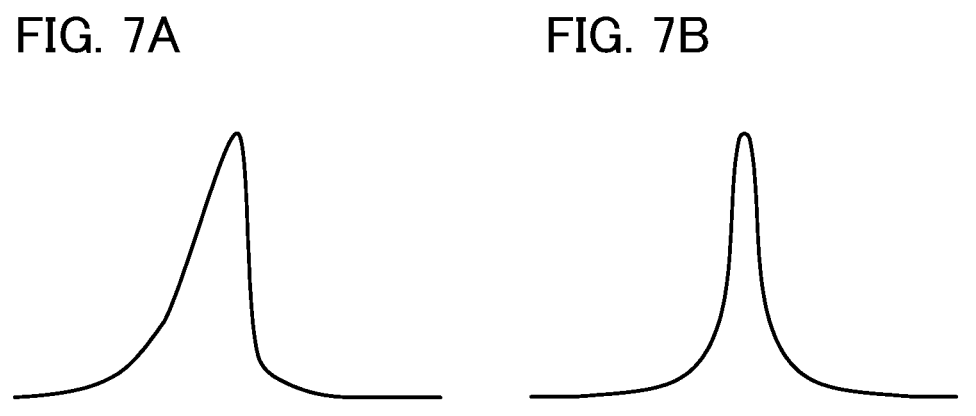

FIG. 7A is a diagram illustrating a PSF before recovery processing, FIG. 7B is a diagram illustrating a PSF after recovery processing, and FIGS. 8A and 8B are diagrams illustrating an MTF and a PTF in image recovery processing according to the second embodiment. (a) in FIG. 8A indicates an MTF before the recovery processing, (b) in FIG. 8A indicates an MTF after the recovery processing, (a) in FIG. 8B indicates the PTF before the recovery processing, and (b) in FIG. 8B indicates the PTF after the recovery processing.

As illustrated in FIG. 7A, the PSF before the recovery processing has an asymmetric spread, and the PTF has a non-zero value as indicated by (a) in FIG. 8B due to the asymmetry. In the recovery processing in the second embodiment, the MTF is amplified as indicated by (b) in FIG. 8A, and the PTF is corrected to zero as indicated by (b) in FIG. 8B. Thereby, the PSF after the recovery processing is symmetrical and sharp as illustrated in FIG. 7B.

This image recovery filter is acquired by performing an inverse Fourier transform on a function designed based on the reciprocal of the optical transfer function (OTF) of the imaging optical system. The image recovery filter used in the second embodiment can be changed appropriately, and for example, the Wiener filter described above may be used.

When the Wiener filter is used, an image recovery filter that is actually convoluted on an image can be created by performing an inverse Fourier transform on the following Equation 14. A signal to noise ratio (SNR) is a signal-to-noise ratio.

$$M(u, v) = \frac{1}{H(u, v)} \frac{|H(u, v)|^2}{|H(u, v)|^2 + SNR^2} \qquad \text{(Equation 14)}$$

Figure 9:
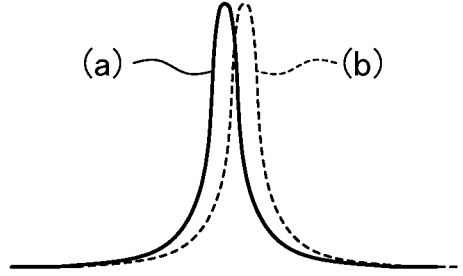
FIG. 9 is a diagram illustrating two color components imaged as a PSF for a chromatic aberration of magnification according to the second embodiment.
Figure 10:
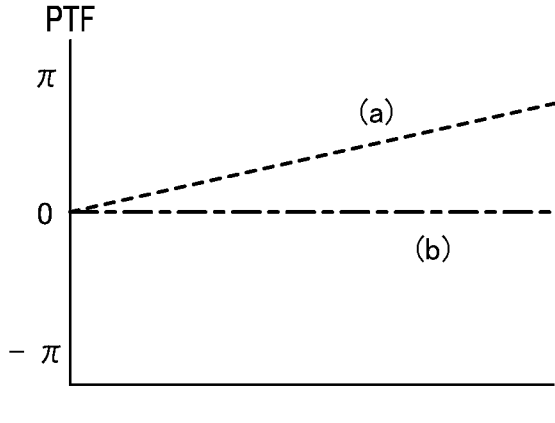
FIG. 10 is a diagram illustrating PTF of the chromatic aberration of magnification according to the second embodiment.

Here, a chromatic aberration of magnification will be described. FIG. 9 is a diagram illustrating two color components imaged as a PSF for the chromatic aberration of magnification according to the second embodiment, and (b) in FIG. 9 indicates two color components imaged as PSF having the same shape at a position translated in parallel with reference to the imaging position indicated by (a) in FIG. 9. FIG. 10 illustrates a PTF at this time. FIG. 10 is a diagram illustrating the PTF for the chromatic aberration of magnification according to the second embodiment.

(a) and (b) in FIG. 10 correspond to (a) and (b) in FIG. 9, respectively, and the phase of PTF is a straight line having a slope in (b) of FIG. 10. In the image recovery filter in the second embodiment, both such a linear PTF and a non-linear PTF such as that indicated by (a) in FIG. 8B are included in the original OTF, and thus correction can be performed as indicated by (b) in FIG. 10.

An image recovery filter is generated based on an OTF obtained by removing a straight line component from a PTF in advance, and thus it is possible to generate an image recovery filter that does not correct a magnification chromatic aberration component as parallel translation as illustrated in FIG. 9. On the other hand, when a magnification chromatic aberration component is removed in a spatial region, PSF is generated by translating (b) in FIG. 9 in parallel to the position of (a) and is subjected to Fourier transform, whereby it is possible to similarly generate an OTF from which a magnification chromatic aberration component is removed.

Actually, the shapes of PSFs in (a) and (b) in FIG. 9 are different, and thus, for example, a method of matching the center of gravity is used, or a root mean square of a difference between (a) and (b) in FIG. 9 may be minimized for alignment. By generating an image recovery filter based on this OTF, it is possible to generate an image recovery filter that does not correct a magnification chromatic aberration component as parallel translation.

As described above, in the second embodiment, an image recovery filter does not include a component for correcting a chromatic aberration of magnification, and thus the chromatic aberration of magnification is not corrected by applying the image recovery filter. Thus, it is possible to separately process correction and sharpening of an asymmetrical aberration for each color component from correction of a color shift, which is a component of parallel translation of a chromatic aberration of magnification. That is, in the second embodiment, a magnification chromatic aberration component is not corrected in recovery processing, and the magnification chromatic aberration component is corrected after the recovery processing.

A correction amount of a chromatic aberration of magnification can be calculated from design values of an imaging optical system, such as a linear component of a PTF and the shape of the PSF, as described above. That is, the chromatic aberration of magnification can be treated as a shift amount of R with respect to G and a shift amount of B with respect to G. A method of correcting a chromatic aberration of magnification in the second embodiment will be described below.

The amount of color shift due to a chromatic aberration of magnification generally fluctuates depending on an image height, which indicates a distance from the center of an optical axis of an optical system used for imaging. Here, a color shift rate M with respect to a certain image height L is defined as shown in the following Equation 15 from the amount of color shift D at the image height L.

$$M=D/L \qquad \text{(Equation 15)}$$

Figure 11:
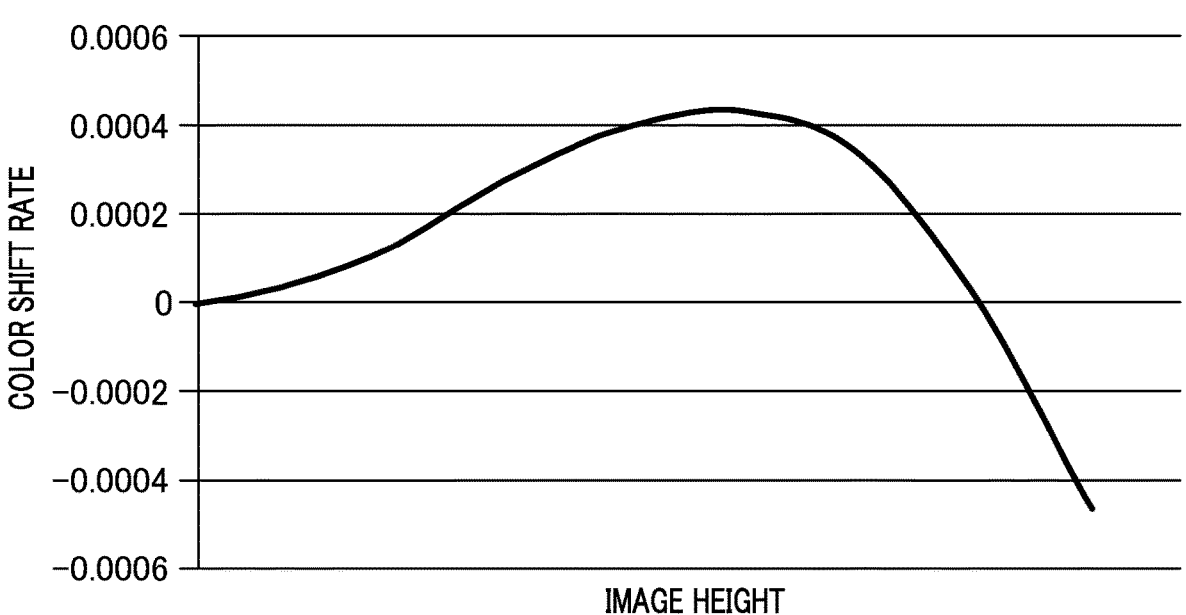
FIG. 11 is a diagram illustrating a correction amount of a chromatic aberration of magnification according to the second embodiment.

FIG. 11 is a diagram illustrating a correction amount of a chromatic aberration of magnification according to the second embodiment, and illustrates an example of an image height and a color shift rate of a certain optical system. As can be seen from FIG. 11, a relationship between the image height and the color shift rate can be approximated by a higher-order polynomial expression.

For this reason, a high-order polynomial approximate expression F(l) representing a relationship between an image height l and a color shift rate m is calculated and used as a correction value. Here, a cubic polynomial expression is used as follows. In the following equation, a, b, and c represent coefficients.

$$m=F(l)=al3+bl2+cl \qquad \text{(Equation 16)}$$

Correction is performed by shifting a pixel position, but a specific method is shown below. First, in a pixel (X, Y) of a plane (R plane, B plane) to be corrected, a color shift rate M is obtained from an image height L of the pixel (X, Y), for example, by the following Equation 17. A coordinate system having an optical center of (0, 0) is used.

$$M=F(L) \qquad \text{(Equation 17)}$$

Next, coordinates (X1, Y1) of a pixel generated by correcting a color shift are obtained, for example, by following Equations 18 and 19.

$$X1=M \times X \qquad \text{(Equation 18)}$$

$$Y1=M \times Y \qquad \text{(Equation 19)}$$

A pixel value corresponding to the coordinates (X1, Y1) on the plane to be corrected is generated by general interpolation processing and is set as a pixel value of the pixel (X, Y). A color shift is corrected by performing this operation for all pixels. The above is an outline of processing for correcting a chromatic aberration of magnification for an image in the second embodiment.

Details of the processing for correcting a chromatic aberration of magnification for an image in the second embodiment will be described below. In the image processing method according to the second embodiment, the pixel value adjustment processing for suppressing coloring in step S308 of FIG. 3 in the first embodiment is performed by changing a correction strength (adjustment amount) in accordance with hue, saturation, and brightness after image recovery processing.

When a hue change amount is limited for all pixels of which hue change amounts before and after recovery processing exceed a threshold value as in the first embodiment, the hue change amount is also limited for pixels of which the hue has changed by correct correction. Thus, the original recovery effect obtained by recovery processing may be canceled. In order to avoid this, a pixel value adjustment amount of a pixel after recovery processing is changed in accordance with hue, saturation, and brightness as shown in the following Equations 20 and 21.

$$Rt=R'+(R''-R')\times\beta\times W \qquad \text{(Equation 20)}$$

$$Bt=B'+(B''-B')\times\beta\times W \qquad \text{(Equation 21)}$$

$$W=Wh\times Ws\times Wv \qquad \text{(Equation 22)}$$

Here, W is a coefficient set as in Equation 22 based on weighting coefficients Wh, Ws, and Wv. The weighting coefficients Wh, Ws, and Wv are weighting coefficients for hue information H, saturation information S, and brightness information V, respectively, of the image after the image recovery processing which are acquired in step S306, and have relationships, for example, as illustrated in FIGS. 12, 13, and 14.

Figure 12:
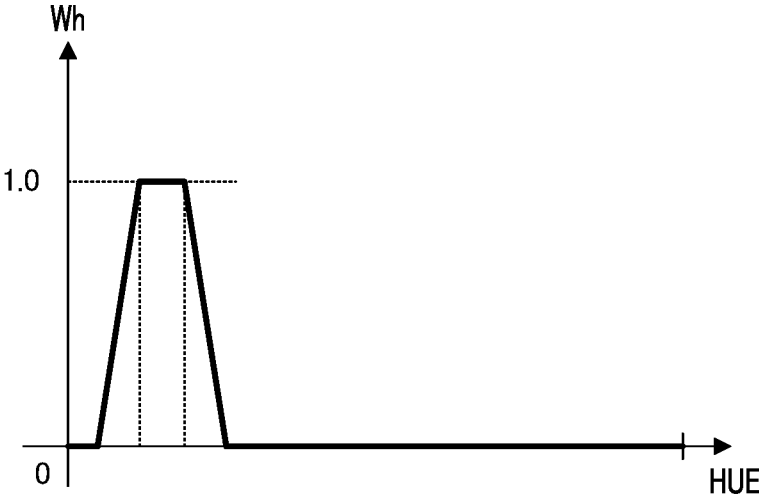
FIG. 12 is a diagram illustrating an example of a relationship between a hue and a weighting coefficient Wh in the second embodiment.
Figure 13:
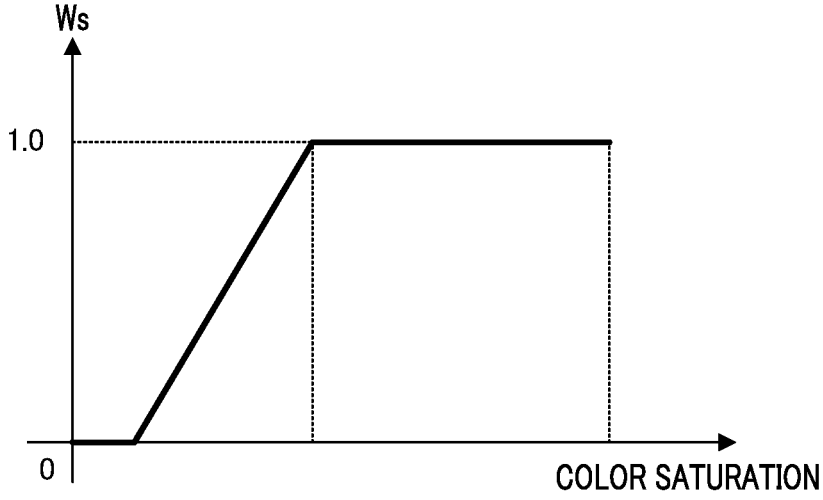
FIG. 13 is a diagram illustrating an example of a relationship between saturation and a weighting coefficient Ws in the second embodiment.
Figure 14:
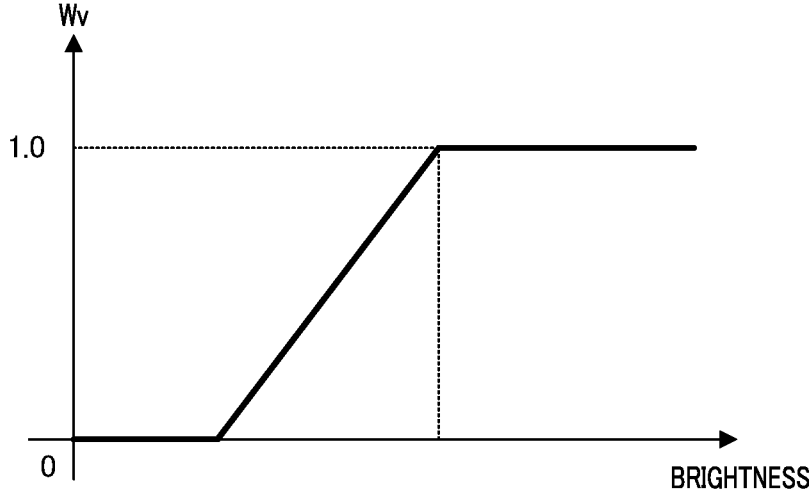
FIG. 14 is a diagram illustrating an example of a relationship between brightness and a weighting coefficient Wv in the second embodiment.

FIG. 12 is a diagram illustrating an example of a relationship between hue and the weighting coefficient Wh in the second embodiment, FIG. 13 is a diagram illustrating an example of a relationship between saturation and the weighting coefficient Ws in the second embodiment, and FIG. 4 is a diagram illustrating an example of a relationship between brightness and the weighting coefficient Wv in the second embodiment.

In this manner, according to the second embodiment, conditions for applying pixel value adjustment of an image after image recovery processing are limited, and thus it is possible to suppress coloring that does not originally occur after image recovery processing while maintaining the original recovery effect of image recovery.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

The present invention includes, for example, those implemented using at least one processor or circuit configured to function as the image processing devices of the embodiments described above. Note that distributed processing may be performed using a plurality of processors.

This application claims the benefit of Japanese Patent Application No. 2022-171976, filed on Oct. 27, 2022, which is hereby incorporated by reference herein in its entirety.

What is claimed is:

1. An image processing device that performs recovery processing for recovering image deterioration in an image obtained by capturing an image formed by an imaging optical system, the image processing device comprising:
at least one processor or circuit configured to function as
a first color feature value acquisition unit configured to acquire first color feature value related to a color of each pixel based on pixel information before the recovery processing is performed,
an image recovery processing unit configured to perform the recovery processing on the image,
a second color feature value acquisition unit configured to acquire second color feature value related to a color of each pixel based on pixel information after the recovery processing is performed, and a pixel value correction unit configured to correct the image after the recovery processing based on the first color feature value and the second color feature value;
wherein the first color feature value and the second color feature value include at least hue information, and
wherein the pixel value correction unit is configured to correct the image by correcting pixel values of a plurality of color components of the image on which the recovery processing has been performed so that the hue information corresponding to the first color feature value and the hue information corresponding to the second color feature value are included in a predetermined range.

2. The image processing device according to claim 1, wherein the image recovery processing unit performs the recovery processing on a RAW image having a color component of one color for each pixel.

3. The image processing device according to claim 1, wherein the pixel value correction unit is configured to correct the image by correcting pixel values of an R component and a B component of the image on which the recovery processing has been performed.

4. The image processing device according to claim 1, wherein the pixel value correction unit adjusts a correction strength in accordance with brightness, hue, or saturation after the recovery processing.

5. The image processing device according to claim 4, wherein the pixel value correction unit is configured to increase a correction strength in accordance with an increase of the brightness with respect to the hue and the saturation.

6. The image processing device according to claim 4, wherein the pixel value correction unit is configured to increase a correction strength in a case where the hue is closer to a predetermined hue range with respect to the brightness and the saturation.

7. The image processing device according to claim 4, wherein the pixel value correction unit is configured to increase a correction strength in accordance with an increase of the saturation with respect to the brightness and the hue.

8. The image processing device according to claim 1, wherein a magnification chromatic aberration component is not corrected in the recovery processing, and the magnification chromatic aberration component is corrected after the recovery processing.

9. An image processing method of performing recovery processing to recover image deterioration in an image obtained by capturing an image formed by an imaging optical system, the image processing method comprising:
acquiring first color feature value related to a color of each pixel based on pixel information before the recovery processing is performed;
performing the recovery processing on the image;
acquiring second color feature value related to a color of each pixel based on pixel information after the recovery processing is performed; and
correcting the image after the recovery processing based on the first color feature value and the second color feature value;
wherein the first color feature value and the second color feature value include at least hue information, and
wherein the correcting the image after the recovery processing is performed by correcting pixel values of a plurality of color components of the image on which the recovery processing has been performed so that the hue information corresponding to the first color feature value and the hue information corresponding to the second color feature value are included in a predetermined range.

10. The image processing method according to claim 9, wherein, the recovery processing is performed on a RAW image having a color component of one color for each pixel.

11. The image processing method according to claim 9, wherein the correcting the image after the recovery processing is performed by correcting pixel values of an R component and a B component of the image on which the recovery processing has been performed.

12. The image processing method according to claim 9, wherein, in the correcting of the image, a correction strength is adjusted in accordance with brightness, hue, or saturation after the recovery processing.

13. The image processing method according to claim 12, wherein the correcting the image after the recovery processing is performed by increasing a correction strength in accordance with an increase of the brightness with respect to the hue and the saturation.

14. The image processing method according to claim 12, wherein the correcting the image after the recovery processing is performed by increasing a correction strength in a case where the hue is closer to a predetermined hue range with respect to the brightness and the saturation.

15. The image processing method according to claim 12, wherein the correcting the image after the recovery processing is performed by increasing a correction strength in accordance with an increase of the saturation with respect to the brightness and the hue.

16. The image processing method according to claim 9, wherein a magnification chromatic aberration component is not corrected in the recovery processing, and the magnification chromatic aberration component is corrected after the recovery processing.

17. A non-transitory computer-readable storage medium configured to store a computer program for an image processing device that performs recovery processing for recovering image deterioration in an image obtained by capturing an image formed by an imaging optical system to execute the following steps:

acquiring first color feature value related to a color of each pixel based on pixel information before the recovery processing is performed;

performing the recovery processing on the image;

acquiring second color feature value related to a color of each pixel based on pixel information after the recovery processing is performed; and correcting the image after the recovery processing based on the first color feature value and the second color feature value;

wherein the first color feature value and the second color feature value include at least hue information, and wherein the correcting the image after the recovery processing is performed by correcting pixel values of a plurality of color components of the image on which the recovery processing has been performed so that the hue information corresponding to the first color feature value and the hue information corresponding to the second color feature value are included in a predetermined range.

* * * * *